United States Patent
Sasa

(10) Patent No.: US 9,191,535 B2
(45) Date of Patent: Nov. 17, 2015

(54) IMAGE FORMING APPARATUS, IMAGE FORMING METHOD AND STORAGE MEDIUM

(71) Applicant: Tomohiro Sasa, Kanagawa (JP)

(72) Inventor: Tomohiro Sasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 4 days.

(21) Appl. No.: 14/304,202

(22) Filed: Jun. 13, 2014

(65) Prior Publication Data

US 2014/0376063 A1  Dec. 25, 2014

(30) Foreign Application Priority Data

Jun. 20, 2013 (JP) ................. 2013-129543

(51) Int. Cl.
| | | |
|---|---|---|
| H04N 1/407 | (2006.01) | |
| G06T 5/00 | (2006.01) | |
| B41J 29/38 | (2006.01) | |
| H04N 1/00 | (2006.01) | |
| H04N 1/028 | (2006.01) | |

(52) U.S. Cl.
CPC ......... *H04N 1/00755* (2013.01); *H04N 1/0075* (2013.01); *H04N 1/02815* (2013.01)

(58) Field of Classification Search
CPC ................................ H04N 1/00755
USPC ...................................... 347/14, 16
See application file for complete search history.

(56) References Cited

U.S. PATENT DOCUMENTS

| | | | | |
|---|---|---|---|---|
| 7,542,692 | B2 * | 6/2009 | Yamamoto et al. ............ | 399/69 |
| 2009/0185240 | A1 * | 7/2009 | Kato et al. ..................... | 358/474 |
| 2010/0026738 | A1 * | 2/2010 | Saikawa et al. ................. | 347/1 |
| 2013/0222458 | A1 * | 8/2013 | Yatsunami ...................... | 347/16 |
| 2013/0229454 | A1 * | 9/2013 | Yatsunami ...................... | 347/14 |

FOREIGN PATENT DOCUMENTS

| | | | |
|---|---|---|---|
| JP | 2004-122681 | | 4/2004 |
| JP | 2004243696 A | * | 9/2004 |

* cited by examiner

*Primary Examiner* — Cheukfan Lee
(74) *Attorney, Agent, or Firm* — Harness, Dickey & Pierce, P.L.C.

(57) ABSTRACT

An image forming apparatus includes a detection unit that emits light on a recording medium or a platen and detects reflected light while the detection unit moves in a direction perpendicular to a transportation direction of the recording medium; a width calculation unit that compares a value indicative of light intensity responsive to the reflected light with a threshold, and calculates a width of the recording medium measured from a position of the detection unit where the value indicative of light intensity responsive to the reflected light becomes greater than or equal to the threshold; an image formation unit that performs an operation of forming an image based on the calculated width of the recording medium; and an image formation control unit that halts the operation of forming the image upon detecting that the calculated width is less than or equal to a predefined value.

8 Claims, 11 Drawing Sheets

IMAGE FORMING APPARATUS, IMAGE FORMING METHOD AND STORAGE MEDIUM

BACKGROUND OF THE INVENTION

1. Field of the Invention

The disclosures herein generally relate to an image forming apparatus, an image forming method and a storage medium thereof.

2. Description of the Related Art

Some image forming apparatuses such as inkjet type printers, for example, have a paper detection sensor for detecting a position of an edge of a paper so as to form an image fitted to a size of the paper (See, for example, Japanese Published Patent Application No. 2004-122681). In such an image forming apparatus, an image is formed according to a paper width obtained from a position of an edge of a paper detected by the paper detection sensor, and a failure such as an offset of image can be prevented.

However, when a foreign object such as paper dust enters a detection region for the paper width, the paper detection sensor may recognize a position of the paper dust as the position of the edge of the paper, to give a false detection for the paper size. If the paper detection sensor wrongly detects the paper size, a printing failure such as an offset of position of image or a contamination on paper by discharging an ink droplet on a paper path may occur.

SUMMARY OF THE INVENTION

It is a general object of at least one embodiment of the present invention to provide an image forming apparatus, an image forming method and a storage medium that substantially obviate one or more problems caused by the limitations and disadvantages of the related art.

In one embodiment, an image forming apparatus includes a detection unit that emits light on a recording medium or a platen and detects light reflected from the recording medium or the platen while the detection unit moves in a direction perpendicular to a transportation direction of the recording medium; a width calculation unit that compares a value indicative of light intensity responsive to the light reflected from the recording medium or the platen detected by the detection unit with a threshold, and calculates a width of the recording medium measured from a position of the detection unit where the value indicative of light intensity responsive to the reflected light becomes greater than or equal to the threshold; an image formation unit that performs an operation of forming an image on the recording medium based on the width of the recording medium calculated by the width calculation unit; and an image formation control unit that halts the operation of forming the image on the recording medium by the image formation unit upon detecting that the width of the recording medium calculated by the width calculation unit is less than or equal to a predefined value.

In another embodiment, an image forming method includes a detection unit emitting light on a recording medium or a platen and detecting light reflected from the recording medium or the platen while the detection unit moves in a direction perpendicular to a transportation direction of the recording medium; comparing a value indicative of light intensity responsive to the light reflected from the recording medium or the platen detected by the detection unit with a threshold, and calculating a width of the recording medium measured from a position of the detection unit where the value indicative of light intensity responsive to the reflected light becomes greater than or equal to the threshold; performing an operation of forming an image on the recording medium based on the calculated width of the recording medium; and halting the operation of forming the image on the recording medium upon detecting that the calculated width of the recording medium is less than or equal to a predefined value.

In yet another embodiment, a non-transitory computer-readable storage medium stores a program for causing a computer to perform a process of forming an image on a recording medium. The process includes a detecting step of a detection unit emitting light on the recording medium or a platen and detecting light reflected from the recording medium or the platen while the detection unit moves in a direction perpendicular to a transportation direction of the recording medium; a width calculation step of comparing a value indicative of light intensity responsive to the light reflected from the recording medium or the platen detected by the detection unit with a threshold, and calculating a width of the recording medium measured from a position of the detection unit where the value indicative of light intensity responsive to the reflected light becomes greater than or equal to the threshold; an image formation step of performing an operation of forming an image on the recording medium based on the width of the recording medium calculated in the width calculation step; and an image formation control step of halting the operation of forming the image on the recording medium upon detecting that the width of the recording medium calculated in the width calculation step is less than or equal to a predefined value.

According to the embodiment of the present invention, an image forming apparatus that prevents a printing failure occurring due to a false detection for a width of a recording medium can be provided.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, embodiments of the present invention will be described with reference to the accompanying drawings. In each drawing, the same numerical symbols are assigned to the same members, and duplicate explanation may be omitted.

First Embodiment

Figure 1:
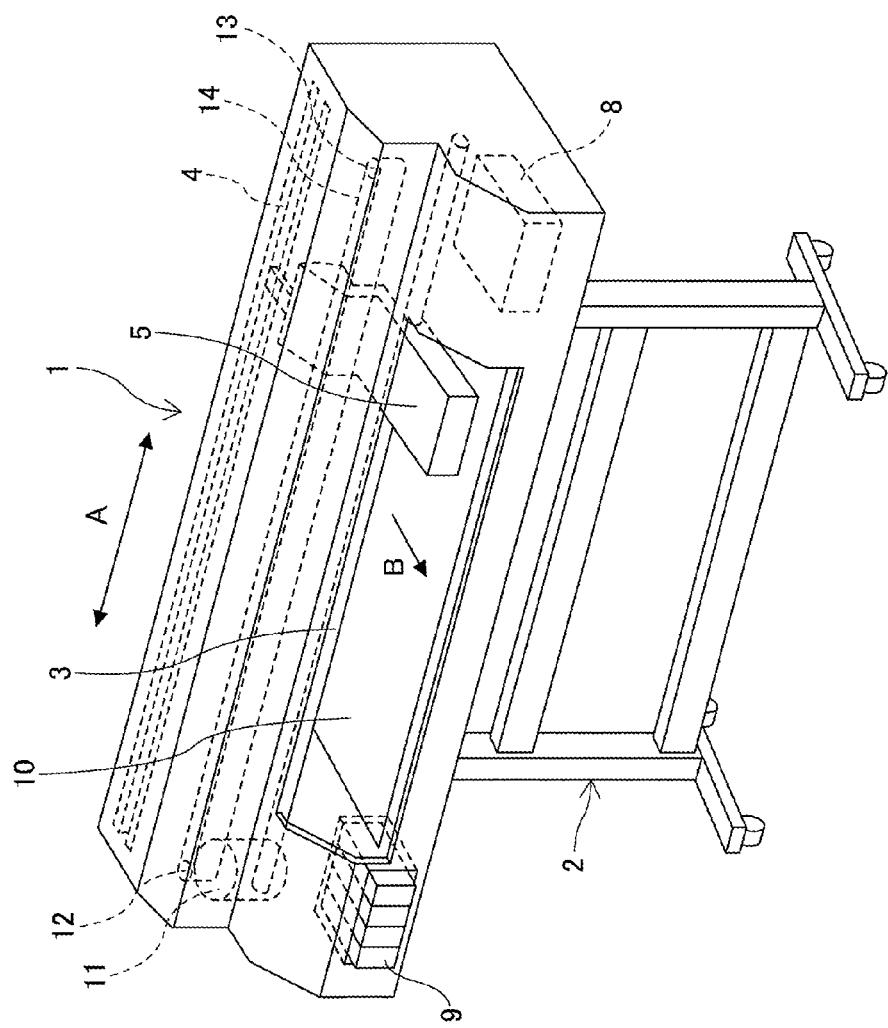
FIG. 1 is a diagram illustrating an example of a schematic configuration of an image forming apparatus according to a first embodiment.

FIG. 1 is a diagram illustrating an example of a schematic configuration of an image forming apparatus 1 according to a first embodiment. The image forming apparatus 1 is a serial type inkjet recording apparatus, and supported by a supporting frame 2.

A carriage 5 as an image forming unit includes a recording head that discharges ink droplets as liquid droplets to form an image, and is held movably in directions of an arrow "A" (main scanning directions) by a guide rod 3 and a sub guide 4.

The carriage 5 is fixed to a timing belt 14, which is rotationally driven, and is moved in the directions of the arrow "A" along the guide rod 3 and the sub guide 4 by the rotating timing belt 14. The timing belt 14 is stretched between a driving pulley 12 and a pressure roller 13 so as to have a Predetermined tensile force, and holds the carriage 5 without becoming loose. The timing belt 14 rotates accompanying the driving pulley 12 which is rotated by a main scanning motor 11, and moves the carriage 5 in the directions of the arrow "A".

A paper 10 as a recording medium is intermittently transported in a direction of an arrow "B" (a sub-scanning direction) by a transportation unit (not shown) under the carriage 5 which is moved back and forth in the directions of the arrow "A". A record head (described below) mounted on the carriage 5 discharges ink droplets to form an image on the transported paper 10 based on input image data. Ink is arbitrarily supplied to the record head in the carriage 5 from a cartridge 9.

At a retract position of the carriage 5, a maintenance unit 8 is provided that maintains discharge ports so as to prevent clogging or the like by cleaning and capping the record head.

Figure 2:
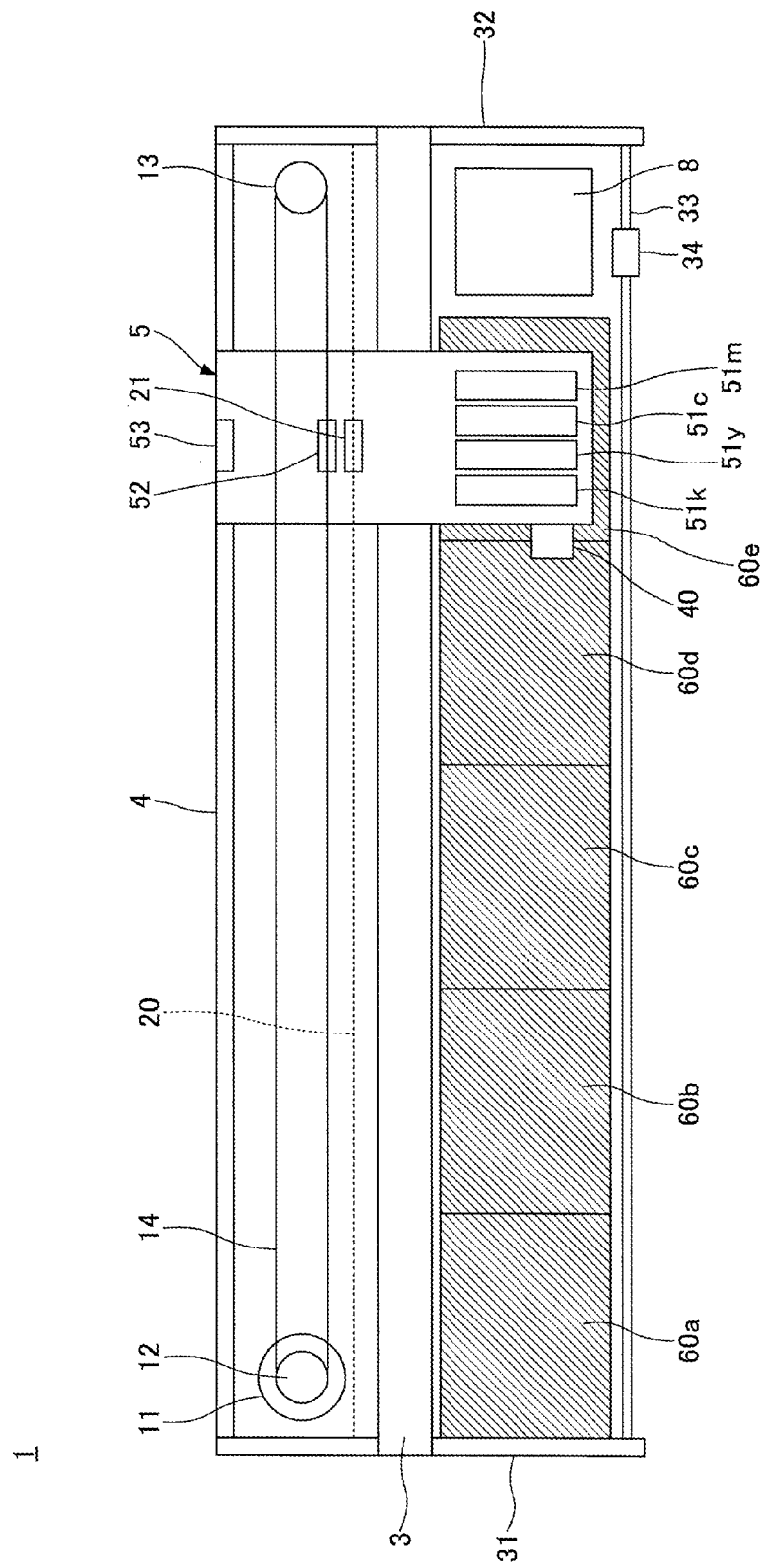
FIG. 2 is a top view illustrating an example of a schematic configuration of a main section of the image forming apparatus according to the first embodiment.

FIG. 2 is a top view illustrating an example of a schematic configuration of a main section of the image forming apparatus 1 according to the first embodiment.

The carriage 5 is held movably by the guide rod 3 and the sub guide 4, which are stretched between a left side plate 31 and a right side plate 32, and is moved with the timing belt which is rotationally driven by the main scanning motor 11. The carriage 5 is held on the guide rod 3 and the sub guide 4 by a bearing and a sub guide receive unit 53, and fixed on the timing belt 14 by a belt hold unit 52.

Moreover, between the left side plate 31 and the right side plate 32, an encoder sheet 20 is provided along the main scanning directions. On the encoder sheet 20, slits are formed at regular intervals, and an encoder sensor 21 provided on the moving carriage 5 reads out the slits on the encoder sheet 20. A position of the carriage 5 in the main scanning directions is detected based on a signal output from the encoder sensor 21 corresponding to the slits on the encoder sheet 20.

On the carriage 5 plural record heads 51 are provided for discharging ink droplets, colors of which are different from each other. The record head 51 includes plural discharge ports, from which ink droplets are discharged, arranged on a surface opposed to the paper 10. A liquid chamber in the record head 51 is pressurized by piezoelectric elements or the like, and ink droplets are discharged from the discharge ports. The image forming apparatus 1 includes record heads 51$k$, 51$y$, 51$c$ and 51$m$ (collectively referred to as record head 51), which discharge black, yellow, cyan and magenta ink droplets, respectively, and form a full color image on the paper 10.

On the side surface of the carriage 5, a paper detection sensor 40 is provided. The paper detection sensor 40 is moved with the carriage 5 in the main scanning directions and detects a position of an edge of the paper 10.

On the downstream side of the transport direction of the image forming position of the paper 10, a cutter 34 is provided as a cut unit which cuts the paper 10 while moving in the main scanning direction along a rail 33 stretched between the left side plate 31 and the right side plate 32. The cutter 34 cuts, for example, an elongated paper on which an image is printed to be a desired size.

On a transportation path of the paper 10, plural platens 60$a$, 60$b$, 60$c$ and 60$d$ are juxtaposed in the main scanning directions being opposed to the record head 51. The paper 10 is transported intermittently in the sub scanning direction between the record head 51 on the carriage 5 and the platen 60 by a transportation unit (not shown). The platen 60 includes plural suction ports 61 (see FIG. 3), and on a side of the platen 60 opposite to the record head 51 a suction fan (not shown) is provided.

When the paper 10 is transported on the platen 60, the paper 10 is suctioned by the suction fan so that the paper 10 is stuck to the platen 60, and a distance between a surface of the paper 10 and the discharge ports is maintained constant. By maintaining the distance between the surface of the paper 10 and the discharge ports constant, it becomes possible to form a uniform image on the surface of the paper 10.

Figure 4:
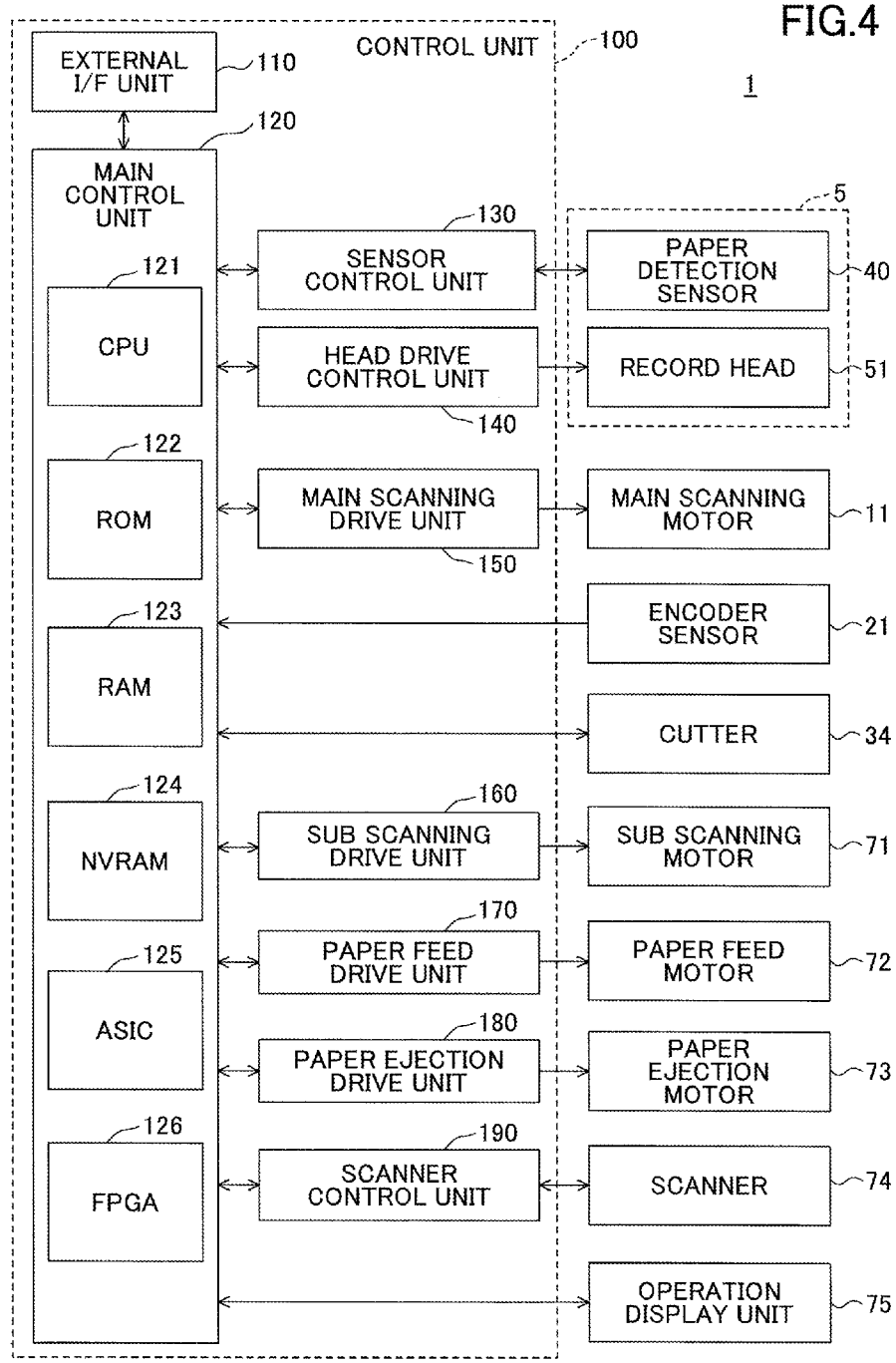
FIG. 4 is a diagram illustrating an example of a hardware configuration of the image forming apparatus according to the first embodiment.

FIG. 4 is a diagram illustrating an example of a hardware configuration of the image forming apparatus 1 according to the first embodiment.

As shown in FIG. 4, the image forming apparatus 1 includes a control unit 100, the carriage 5, the main scanning motor 11, the encoder sensor 21, the cutter 34, a sub scanning motor 71, a paper feed motor 72, a paper ejection motor 73, a scanner 74 and an operation/display unit 75.

The control unit 100 includes an external device I/F 110, a main control unit 120, a sensor control unit 130, a head drive control unit 140, a main scanning drive unit 150, a sub scanning drive unit 160, a paper feed drive unit 170, a paper ejection drive unit 180 and a scanner control unit 190.

The external device I/F 110 is an interface between the image forming apparatus and a peripheral device having a communication function connected via a network such as a LAN (Local Area Network) configured with a data transmission path of wired and/or wireless lines or the like or a WAN (Wide Area Network).

The main control unit 120 includes a CPU (central processing unit) 121, a ROM (Read-only memory) 122, a RAM (Random access memory) 123, an NVRAM (non-volatile random access memory) 124, an ASIC (application specific integrated circuits) 125 or an FPGA (field programmable gate array) 126.

The ROM 122 stores various kinds of programs, data used by the programs or the like. The RAM 123 is used for a memory area in which a program is loaded, a work area for the loaded program, or the like. The CPU 121 processes the program loaded in the RAM 123 and realizes various kinds of functions. The NVRAM 124 stores various kinds of setting information or the like. The ASIC 125 performs various kinds of signal processing for the image data and performs image processing such as sorting. The FPGA 126 performs other input/output signal processing so as to control the whole apparatus.

The sensor control unit 130 controls the paper detection sensor 40 provided on the carriage 5. The head drive control unit 140 controls the record head 51 mounted on the carriage 5, and makes the record head 51 discharge ink droplets based on image data. The main scanning drive unit 150 controls the main scanning motor 11, and controls a position in the main scanning directions of the carriage 5 fixed on the timing belt 14 which is rotated by the main scanning motor 11.

The sub scanning drive unit 160 controls the sub scanning motor 71 which drives a transportation roller to be rotated, and controls an amount of transportation and a timing of transportation for the paper 10 at the image forming position in the sub scanning direction. The paper feed drive unit 170 controls the paper feed motor 72 which drives a paper feed roller to be rotated so as to feed the paper 10 at a predetermined timing. The paper ejection drive unit 180 controls the paper ejection motor 73 which drives a paper ejection roller to be rotated so as to eject the paper 10, on a surface of which an image is formed. The scanner control unit 190 controls the scanner 74 to read out (scan) an image on a readout object and generate image data.

The operation/display unit 75 is hardware including an input unit such as a button that receives an input from a user or a display screen such as a liquid crystal panel having, for example, a touch panel function.

The control unit 100 having the configuration as explained above controls the operation of the respective parts of the image forming apparatus 1, such as the carriage 5, the main scanning motor 11, the encoder sensor 21, the cutter 34, the sub scanning motor 71, the paper feed motor 72, the paper ejection motor 73, the scanner 74 or the operation/display unit 75.

Figure 5:
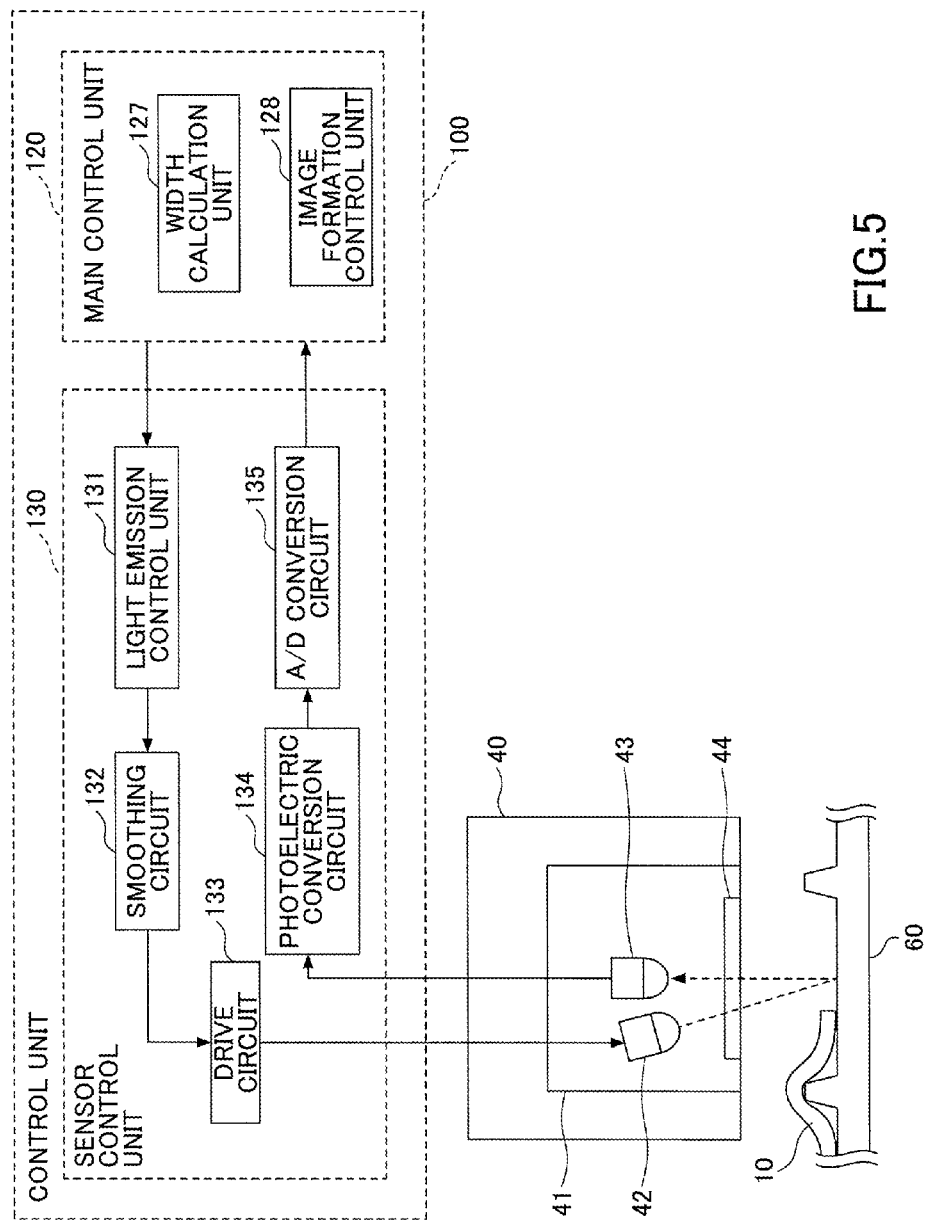
FIG. 5 is a diagram illustrating an example of a schematic configuration of a paper detection sensor and a sensor control unit according to the first embodiment.

FIG. 5 is a diagram illustrating an example of a schematic configuration of the paper detection sensor 40 and the sensor control unit 130 according to the first embodiment.

The paper detection sensor 40 includes a holder 41, a light emission element 42, a light reception element 43 and a lens 44. The paper detection sensor 40 is controlled by the sensor control unit 130 in the control unit 100. The paper detection sensor 40, while moving in the main scanning direction with the carriage 5, irradiates light on the paper 10 or the platen 60 and detects reflected light.

The holder 41 holds by fixing the light emission element 42, the light reception element 43 and the lens 44. The light emission element 42 is controlled by the sensor control unit 130 and irradiates light on the paper 10 or the platen 60. The light reception element 43 detects reflection light of the light irradiated from the light emission element 42 and reflected by the paper 10 or the platen 60. The lens 44 parallelizes the light irradiated from the light emission element 42 and focuses the reflection light on the light reception element 43. The light emission element 42 and the light reception element 43 are arranged in a direction perpendicular to the main scanning direction. According to the above configuration, influence on a detection result from a variation in a velocity of motion of the carriage 5 is reduced.

The sensor control unit 130 includes a light emission control unit 131, a smoothing circuit 132, a drive circuit 133, a photoelectric conversion circuit 134 and an A/D conversion circuit 135.

The light emission control circuit 131 generates a drive waveform based on a PWM (pulse-width modulation) value input from the main control unit 120. The smoothing circuit 132 smoothes the drive waveform generated by the light emission control circuit 131 and outputs it to the drive circuit 133. The drive circuit 133 outputs an electric current based on the smoothed drive waveform to the light emission element 42, and makes the light emission element 42 irradiate light.

The photoelectric conversion circuit 134 converts an intensity of the reflection light detected by the light reception element 43 into an electric signal corresponding to the intensity of the reflection light. The A/D conversion circuit 135 converts the electric signal output from the photoelectric conversion circuit 134 into a digital signal, and outputs it to the main control unit 120 as a read-out value based on the output from the light reception element 43.

The main control unit 120 includes a width calculation unit 127 and an image formation control unit 128. The width calculation unit 127 and the image formation control unit 128 are realized by a process which the program installed in the image forming apparatus 1 makes the CPU 121 in the main control unit 120 execute. The width calculation unit 127 compares the readout value output from the sensor control unit 130 with a threshold, and calculates a width of the paper 10 based on a position of the paper detection sensor 40 where the readout value is greater than or equal to the threshold. The image formation control unit 128 determines whether the width of the paper 10 is calculated normally by the width calculation unit 127. When the width of the paper 10 is determined to be detected wrongly, the image formation control unit 128 halts the image formation operation by the carriage 5 or the like.

Figure 6:
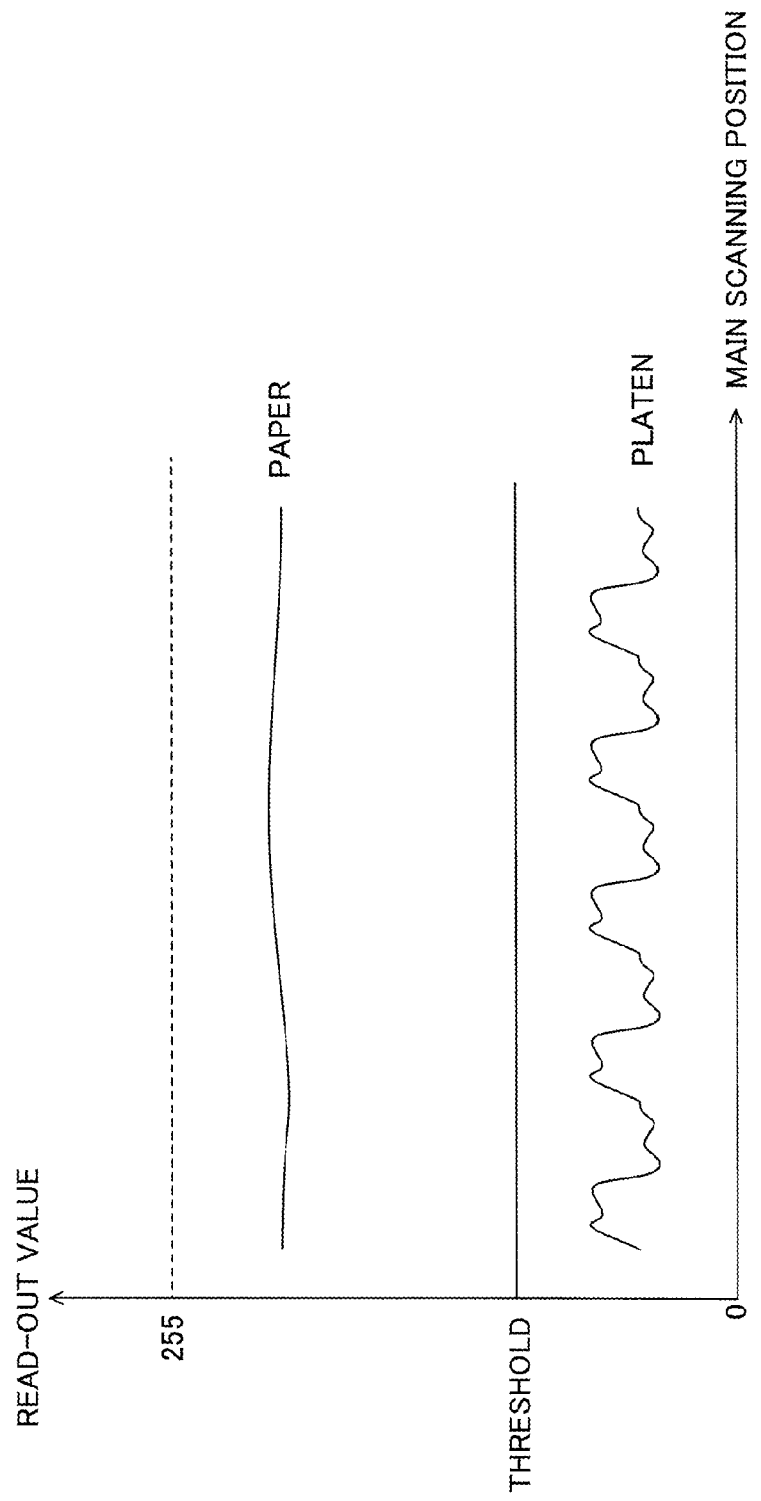
FIG. 6 is a diagram illustrating an example of read-out values based on an output from the paper detection sensor according to the first embodiment.
Figure 7:
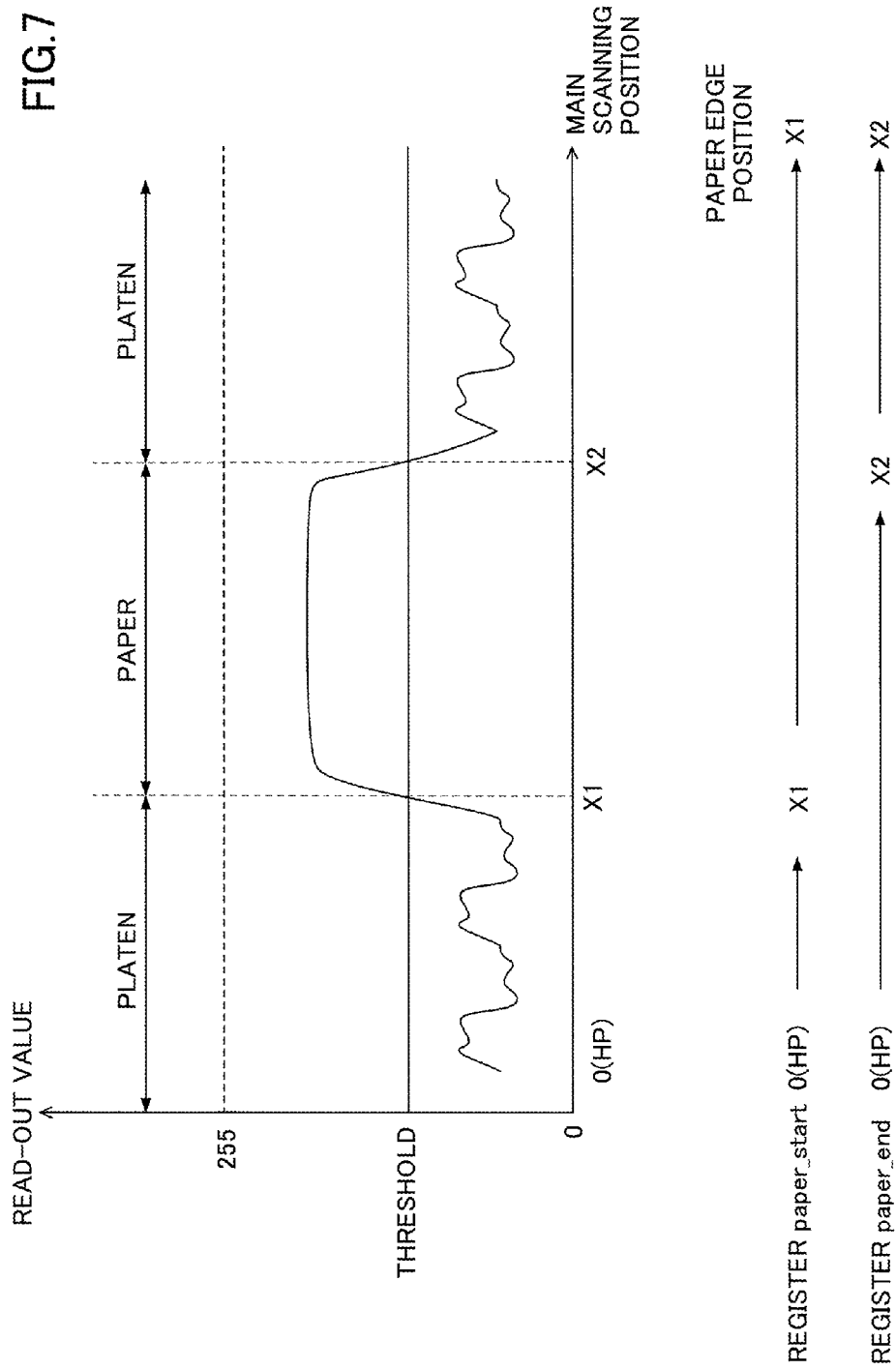
FIG. 7 is a diagram illustrating an example of read-out values based on the output from the paper detection sensor according to the first embodiment.
Figure 8:
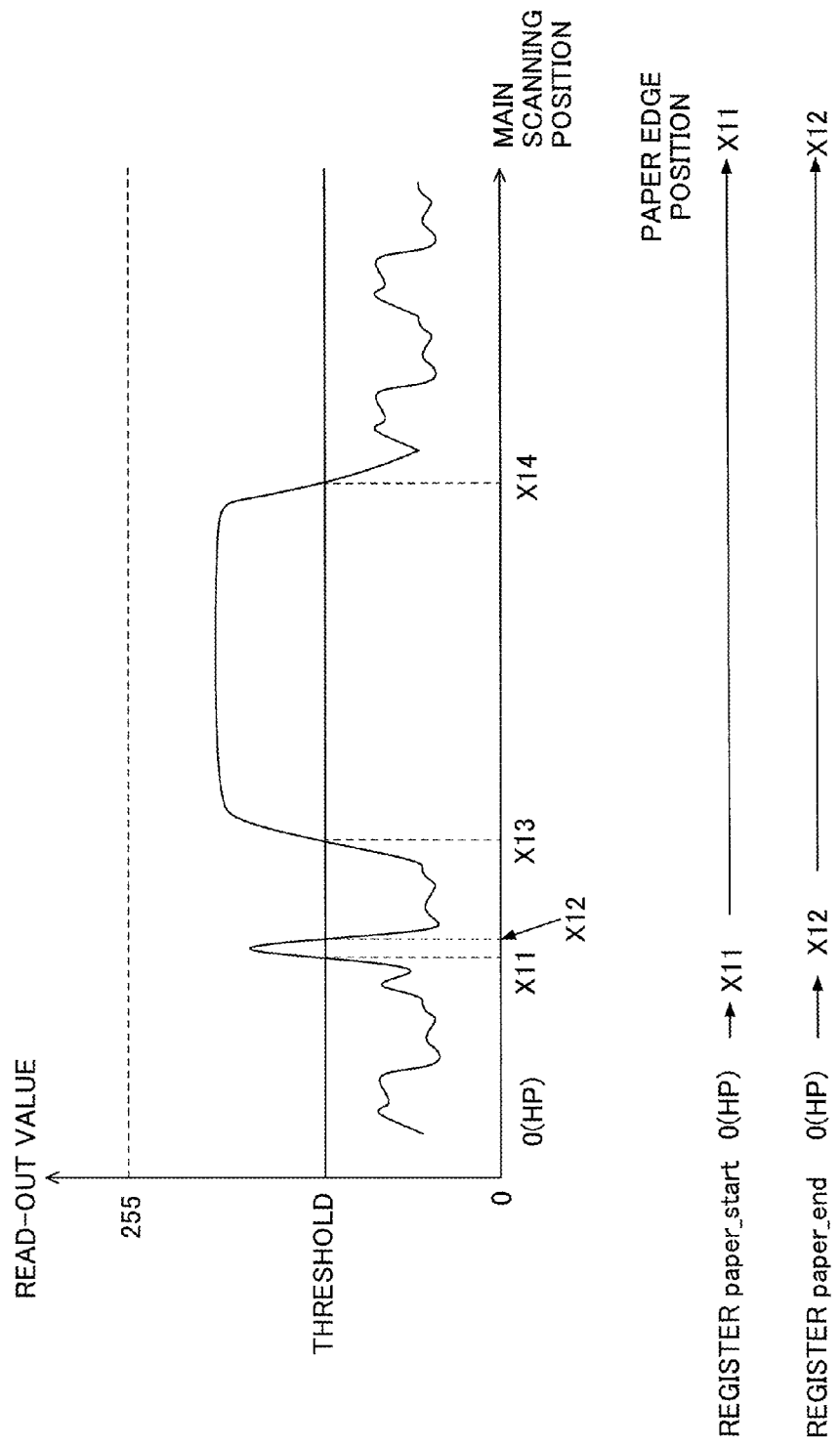
FIG. 8 is a diagram illustrating an example of read-out values based on the output from the paper detection sensor according to the first embodiment.

FIGS. 6 to 8 are diagrams illustrating examples of read-out values based on outputs from the paper detection sensor 40.

The sensor control unit 130 outputs read-out values which are obtained by converting into 256 gradation levels an output from the paper detection sensor 40. A small read-out value indicates that a reflection ratio is low and the object detected is black. Moreover, a large read-out value indicates that the reflection ratio is high and the object detected is white.

FIG. 6 is a diagram illustrating an example of the output when the paper detection sensor 40 detects the paper 10 and the platen 60 while the paper detection sensor 40 moves in the main scanning direction with the carriage 5.

Figure 3:
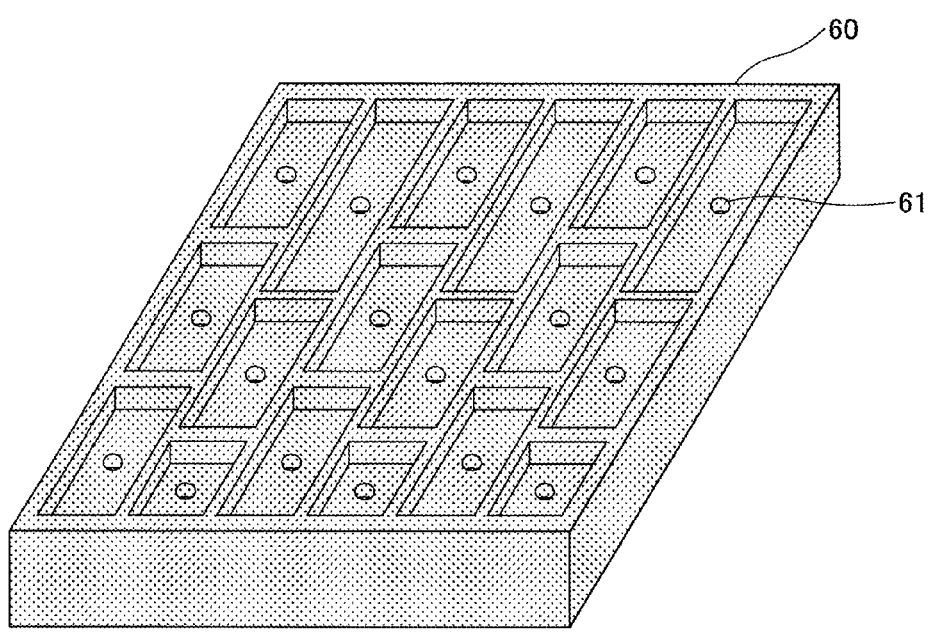
FIG. 3 is a diagram illustrating an example of a platen according to the first embodiment.

As shown in FIG. 6, a variation in the reflection ratio of the paper 10 is small within the same kind of paper, and stable and large read-out values are output. The platen 60 has concavities and convexities on its surface, as shown in FIG. 3, so that the read-out values for the platen include a predetermined width. Meanwhile, the platen 60 has a color close to black so that the read-out value for the platen 60 is different from the read-out value for the paper 10. Accordingly, the read-out values for the platen 60 are smaller than those of the paper 10.

Since the read-out values for the paper 10 are different from the read-out values for the platen 60 so as to set a threshold between them, it becomes possible to determine whether the detection position of the paper detection sensor 40 is on the paper 10 or on the platen 60 by comparing the read-out value with the threshold.

FIG. 7 is a diagram illustrating an example of the read-out values when the paper detection sensor 40 performs detection while the paper detection sensor 40 moves from a home position (HP) of the carriage 5 at one end side of the image forming apparatus 1 to the other end side in the main scanning direction with the carriage 5.

As shown in FIG. 7, the read-out value is less than the threshold when the position in the main scanning direction of the paper detection sensor 40 (main scanning position) is between the home position HP and a position X1. The read-out value is greater than the threshold when the main scanning position is between the position X1 and a position X2. The read-out value is less than the threshold again, when the main scanning position is beyond the position X2.

FIG. 7 shows that when the main scanning position is between the home position HP and the position X1 and when the main scanning position is beyond the position X2, the read-out values are less than the threshold, and the paper detection sensor 40 is on the platen 60. FIG. 7 also shows that when that the main scanning position is between the position X1 and the position X2, the read-out value is greater than the threshold, and the paper detection sensor 40 is on the paper 10.

The CPU 121 in the main control unit 120 includes a register "paper_start" which stores a position in the main scanning direction where the read-out value first exceeds the threshold. Moreover, the CPU 121 includes a register "paper_end" which stores a position in the main scanning direction where the read-out value first goes below the threshold. In FIG. 7, the register "paper_start" in the CPU 121 stores the position X1 and the register "paper_end" stores the position X2. The main scanning position of the paper detection sensor 40 is obtained based on an output from the encoder sensor 21.

The positions stored in the registers "paper_start" and "paper_end" represent positions of edges of the paper 10 in the main scanning direction, respectively. The width calculation unit 127 obtains a width of the paper 10 from a distance between the position X1 and the position X2, stored in the register "paper_start" and the register "paper_end" in the CPU 121, respectively. The head drive control unit 140 corrects image data according to the width of the paper 10 obtained by the width calculation unit 127, controls the record head 51 based on the corrected image data, and forms an image on the paper 10. In the image forming apparatus 1 according to the present embodiment, since an image is formed according to a width of the paper which is actually detected, a high quality image free from a position offset or the like is output.

The detection of the paper 10 by the paper detection sensor 40 according to the present embodiment is performed, in a first scan where an image formation on the paper 10 by the carriage 5 starts, simultaneously with the image formation on the paper 10. It is possible to make the carriage 5 and the paper detection sensor 40 scan in the main scanning direction without forming an image to detect a width of the paper 10, and then to form an image. However, in the case where a wide paper 10 is used, a specific amount of time is required for the carriage 5 and the paper detection sensor 40 to scan from one side of the paper 10 to the other side of the paper 10. Since an image cannot be formed on the paper 10 during the scanning, the productivity may fall. Accordingly, the detection of the paper 10 by the paper detection sensor 40 is preferably executed simultaneously with the image formation on the paper in the first scan of the carriage 5.

Here, when paper dust exists in an end portion of the platen 60, as shown in FIG. 8, for example, between a position X11 and the position X12, the read-out value becomes more than or equal to the threshold. In this case, the position X1 is stored in the register "paper_start" in the CPU 121, and the position X2 is stored in the register "paper_end". Accordingly, the width calculation unit 127 calculates the width of the paper 10 based on an interval between the position X11 and the position X12. In this way, if the read-out value exceeds the threshold due to the influence of paper dust or the like before reaching a section from the position X13 to the position X14 where the paper 10 actually exists, the width calculation unit 127 wrongly calculates the width of the paper 10. When the width of the paper 10 is wrongly calculated in the first scan by the carriage 5, in the second scan or later an image is formed according to the wrongly calculated width and position of the paper 10, and the image formation position is shifted from the transportation position of the paper 10. The image is output without being formed on the paper 10. Moreover, an ink droplet is discharged on a position where the paper 10 does not exist, and the platen 60 is contaminated by the ink, which will also contaminate the paper 10 transported afterwards.

Figure 9:
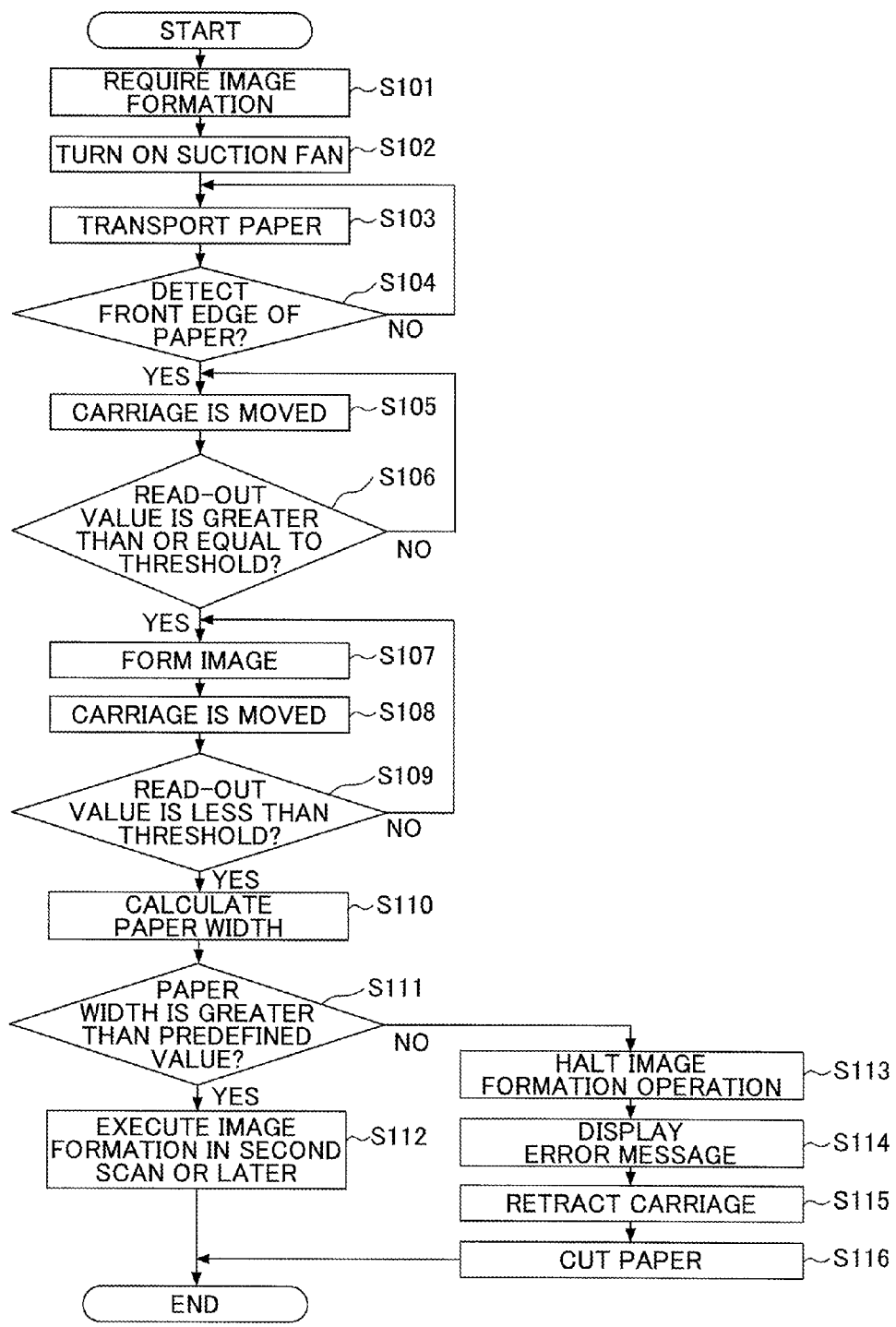
FIG. 9 is a flowchart illustrating an example of an image forming process according to the first embodiment.

The image forming apparatus 1 according to the present embodiment prevents trouble arising from a wrong detection of a paper width due to paper dust or the like by executing an image formation process according to the flowchart exemplified in FIG. 9.

As shown in FIG. 9, a request for forming an image is input to the image forming apparatus 1 (step S101), a suction fan operates so as to suction a transported paper 10 onto a surface of the platen 60 (step S102). Next, a paper 10 is fed and transported inside the image forming apparatus 1 (step S103).

When a front edge of the paper 10 is detected by a sensor provided near the carriage 5 (step S104), the carriage 5 is moved (step S105) and the first scan starts. Next, the carriage 5 is moved in the main scanning direction until the read-out value based on the output from the paper detection sensor 40 becomes greater than or equal to the threshold (step S106).

In the case where the read-out value based on the output from the paper detection sensor 40 becomes greater than or equal to the threshold (step S106: YES), an image formation on the paper 10 is executed (step S107) and the carriage 5 is moved (step S108).

In the case where the read-out value becomes less than the threshold (step S109: YES), the image formation operation stops, and the first scan ends. The width calculation unit 127 calculates a width of the paper 10 based on the position of the paper detection sensor 40 from when the read-out value becomes greater than or equal to the threshold until when the read-out value becomes less than the threshold (step S110).

Next, the image formation control unit 128 compares the width of the paper 10 calculated by the width calculation unit 127 with a predefined value which has been preset (step S111). Here, the predefined value is set, for example, to a value slightly smaller than the minimal width of the paper 10 which the image forming apparatus 1 deals with.

When the width of the paper 10 calculated by the width calculation unit 127 is greater than the predefined value (step S111: YES), it can be determined that the width of the paper 10 has been calculated normally. In this case, the image formation control unit 128 causes image formation on the paper 10 in the second scan or later based on the calculated width of the paper 10 to be executed (step S112), and the process ends.

Moreover, when the width of the paper 10 calculated by the width calculation unit 127 is less than or equal to the predefined value (step S111: NO), it can be determined that the width of the paper 10 has been wrongly detected due to a foreign object such as paper dust. In this case, first the image formation control unit 128 halts the image formation operation by the carriage 5 (step S113), and displays an error message on the operation/display unit 75 to give notice to a user that a malfunction has been detected (step S114). On the operation/display unit 75, a message urging the user to remove the foreign object such as paper dust on the platen 60 may be displayed. Next, the carriage 5 is moved to a retract position (step S115), and cleaning and capping for the discharge ports of the record head 51 are executed by the maintenance unit 8. Furthermore, a front edge portion of the paper 10, on which an image may have been wrongly formed, is cut by the cutter 34 (step S116), and the process ends.

As described above, in the image forming apparatus 1 according to the first embodiment, when a paper width calculated by the width calculation unit 127 based on an output from the paper detection sensor 40 is less than the predefined value, the image formation control unit 128 halts image formation operation. Accordingly, an image formation based on a wrongly detected paper width is not executed, and a printing failure such as a shift of an image position, or paper contamination by an ink droplet discharged on the transportation path is avoided.

Second Embodiment

Next, a second embodiment will be explained with reference to the accompanying drawings. Meanwhile, an explanation for the same members as those explained in the first embodiment will be omitted.

Figure 10:
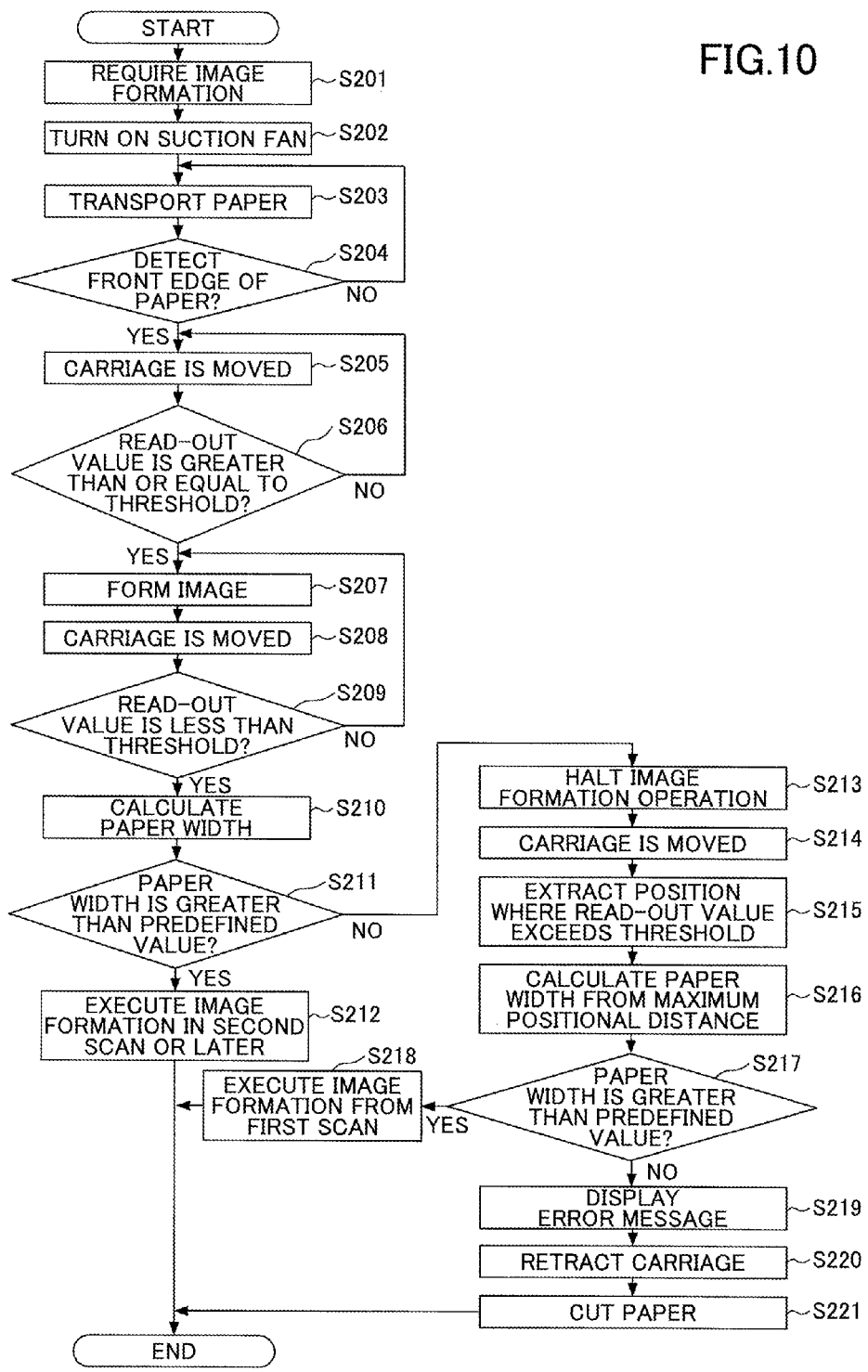
FIG. 10 is a flowchart illustrating an example of an image forming process according to a second embodiment.

FIG. 10 is a flowchart illustrating an example of an image forming process according to a second embodiment.

First, when a request for image formation is input to the image forming apparatus 1 (step S201), a suction fan operates so as to suction a transported paper 10 onto a surface of the platen 60 (step S202). Next, the paper 10 is fed and transported inside the image forming apparatus 1 (step S203).

When a front edge of the paper 10 is detected by a sensor provided near the carriage 5 (step S204), the carriage 5 is moved (step S205) and the first scan starts. Next, the carriage 5 is moved in the main scanning direction until the read-out value based on the output from the paper detection sensor 40 becomes greater than or equal to the threshold (step S206).

In the case where the read-out value based on the output from the paper detection sensor 40 becomes greater than or equal to the threshold (step S206: YES), an image formation operation on the paper 10 is executed (step S207) and the carriage 5 is moved (step S208).

In the case where the read-out value becomes less than the threshold (step S209: YES), the image formation operation stops, and the first scan ends. The width calculation unit 127 calculates a width of the paper 10 based on the position of the paper detection sensor 40 from when the read-out value becomes greater than or equal to the threshold until when the read-out value becomes less than the threshold (step S210).

Next, the image formation control unit 128 compares the width of the paper 10 calculated by the width calculation unit 127 with a predefined value which has been preset (step S211).

When the width of the paper 10 calculated by the width calculation unit 127 is greater than the redefined value (step S211: YES), it can be determined that the width of the paper 10 has been calculated normally. In this case, the image formation control unit 128 causes image formation on the paper 10 in the second scan or later based on the calculated width of the paper 10 to be executed (step S212).

Moreover, when the width of the paper 10 calculated by the width calculation unit 127 is less than or equal to the predefined value (step S211: No), it can be determined that the width of the paper 10 has been wrongly detected due to a foreign object such as paper dust. In this case, first the image formation control unit 128 halts the image formation operation by the carriage 5 (step S213), and the carriage 5 is moved to an edge portion on the opposite side of the paper 10 (step S214) while the image formation operation is halted. Then, a read-out value based on an output from the paper detection sensor 40 moving the carriage 5 is stored, for example, in the RAM 123 in the main control unit 120 with the main scanning position of the paper detection sensor 40.

Next, the width calculation unit 127 acquires a read-out value from the RAM 123, and extracts a main scanning position of the paper detection sensor 40 where the read-out value is greater than a threshold (step S215).

Figure 11:
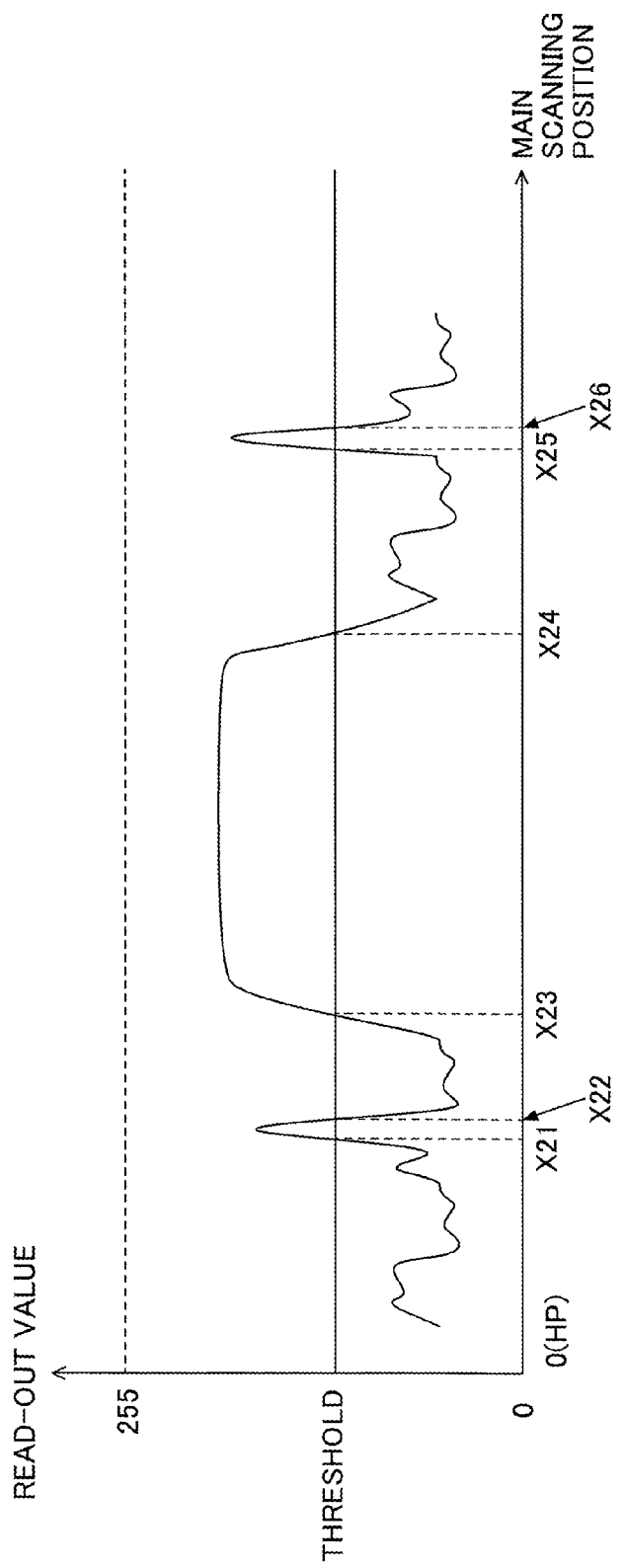
FIG. 11 is a diagram illustrating an example of read-out values based on an output from the paper detection sensor according to the second embodiment.

FIG. 11 is a diagram illustrating an example of a read-out value based on an output from the paper detection sensor 40. In the example shown in FIG. 11, the read-out value is greater than or equal to the threshold when the position in the main scanning direction of the paper detection sensor 40 is between a position X21 and a position X22, between a position X23 and a position X24, and between a position X25 and a position X26. The width calculation unit 127 extracts the above positions where the read-out value becomes more than or equal to the threshold (step S215), and calculates the paper width according to the maximum positional distance out of the positional distance where the read-out value is greater than or equal to the threshold (step S216).

In the example shown in FIG. 11, out of the distance between the position X21 of the paper detection sensor 40 and the position X22, the distance between the position X23 and the position X24 and the distance between the position X25 and the position X26, where the read-out value is greater than or equal to the threshold, the distance between the position X23 and the position X24 is the maximum positional distance. Accordingly, in this example, the paper width is calculated based on the positional distance between the position X23 and the position X24.

Next, the image formation control unit 218 compares the width of the paper 10 calculated by the width calculation unit 127 with the predefined value which has been preset (step S217).

When the width of the paper 10 calculated by the width calculation unit 127 is greater than the predefined value (step S217: YES), it can be determined that the width of the paper 10 has been calculated normally. In this case, the image formation control unit 128 causes image formation on the paper 10 to be executed again from the first scan based on the calculated width of the paper 10 (step S218).

Moreover, when the width of the paper 10 calculated by the width calculated unit 127 is less than or equal to the predefined value (step S217: NO), it can be determined that the width of the paper 10 has been wrongly detected due to any cause. In this case, the image formation control unit 128, in a state where the image formation operation by the carriage 5 is halted, displays an error message on the operation/display unit 75 (step S219). On the operation/display unit 75, a message for urging the user to remove the foreign object such as paper dust on the platen 60 may be displayed. Next, the carriage 5 is moved to a retract position (step S220), and cleaning and capping for the discharge ports of the record head 51 are executed by the maintenance unit 8. Furthermore, a front edge portion of the paper 10, on which an image may have been wrongly formed, is cut by the cutter 34 (step S221), and the process ends.

As described above, in the image forming apparatus 1 according to the second embodiment, even when a foreign object such as paper dust exists on the platen 6, the width of the paper 10 can be obtained accurately without a false detection. Accordingly, an image formation operation based on the wrongly detected paper width is not executed, and a printing failure such as a shift of an image position, or paper contamination by an ink droplet discharged on the transportation path is avoided.

The present invention has been explained with reference to the respective embodiments as stated above. The function, which the image forming apparatus 1 according to the above described respective embodiments is able to perform, may be realized by a computer executing a program in which the respective processes explained above are coded with a programming language appropriate to the image forming apparatus 1 according to the above respective embodiments. Accordingly, the program to realize the image forming apparatus 1 according to the above respective embodiments can be stored in a recording medium readable by a computer.

Accordingly, the program according to the above respective embodiments, stored in a recording medium such as floppy disk (trademark registered), a CD (compact disc) or a DVD (digital versatile disk), can be installed in the image forming apparatus 1 from the recording medium. Moreover, the image forming apparatus 1 includes the external I/F unit 110, and the program according to the above respective embodiments can be downloaded via an electric communication line such as the Internet, and installed.

As stated above, the information processing apparatus, the information processing method and the program thereof according to the embodiments of the present application have been explained. However, the present invention is not limited to these embodiments, but various variations and modifications may be made without departing from the scope of the present invention.

The present application is based on and claims the benefit of priority of Japanese Priority Application No. 2013-129543 filed on Jun. 20, 2013, the entire contents of which are hereby incorporated by reference.

What is claimed is:

1. An image forming apparatus comprising:
    a detection unit that emits light on a recording medium or a platen and detects light reflected from the recording medium or the platen while the detection unit moves in a direction perpendicular to a transportation direction of the recording medium;
    a width calculation unit that compares a value indicative of light intensity responsive to the light reflected from the recording medium or the platen detected by the detection unit with a threshold, and calculates a width of the recording medium measured from a position of the detection unit where the value indicative of light intensity responsive to the reflected light becomes greater than or equal to the threshold;
    an image formation unit that performs an operation of forming an image on the recording medium based on the width of the recording medium calculated by the width calculation unit; and
    an image formation control unit that halts the operation of forming the image on the recording medium by the image formation unit upon detecting that the width of the recording medium calculated by the width calculation unit is less than or equal to a predefined value.

2. The image forming apparatus as claimed in claim 1, wherein the width calculation unit calculates the width of the recording medium based on a positional distance of the detection unit from a position where the detection unit begins moving to a position where the value indicative of light intensity responsive to the reflected light first becomes greater than or equal to the threshold.

3. The image forming apparatus as claimed in claim 1, wherein the width calculation unit calculates the width of the recording medium based on a maximum positional distance from positional distances where the value indicative of light intensity responsive to the reflected light is greater than or equal to the threshold during movement of the detection unit while the operation of forming an image on the recording medium by the image formation unit is suspended.

4. The image forming apparatus as claimed in claim 1 further comprising:
    a display unit that indicates that a malfunction occurs upon the image formation control unit detecting that the width of the recording medium calculated by the width calculation unit is less than or equal to the predefined value.

5. The image forming apparatus as claimed in claim 1 further comprising:
    a cut unit that cuts a front edge portion of the recording medium in the transportation direction of the recording medium upon the image formation control unit detecting that the width of the recording medium calculated by the width calculation unit is less than or equal to the predefined value.

6. The image forming apparatus as claimed in claim 1, wherein the image formation unit includes a record head that discharges ink droplets on the recording medium and a maintenance unit that maintains a discharge port of the record head at a retract position of the record head, and the image formation control unit moves the record head to the maintenance unit upon the image formation control unit detecting that the width of the recording medium calculated by the width calculation unit is less than or equal to the predefined value.

7. An image forming method in an image forming apparatus including a detection unit that emits light on a recording medium or a platen and detects light reflected from the recording medium or the platen while the detection unit moves in a direction perpendicular to a transportation direction of the recording medium, the method comprising:
    comparing a value indicative of light intensity responsive to the light reflected from the recording medium or the platen detected by the detection unit with a threshold, and calculating a width of the recording medium measured from a position of the detection unit where the value indicative of light intensity responsive to the reflected light becomes greater than or equal to the threshold;
    performing an operation of forming an image on the recording medium based on the calculated width of the recording medium; and
    halting the operation of forming the image on the recording medium upon detecting that the calculated width of the recording medium is less than or equal to a predefined value.

8. A non-transitory computer-readable storage medium storing a program for causing a computer to perform a process of forming an image on a recording medium, the process comprising:
    a detecting step of a detection unit emitting light on the recording medium or a platen and detecting light reflected from the recording medium or the platen while the detection unit moves in a direction perpendicular to a transportation direction of the recording medium;
    a width calculation step of comparing a value indicative of light intensity responsive to the light reflected from the recording medium or the platen detected by the detection unit with a threshold, and calculating a width of the recording medium measured from a position of the detection unit where the value indicative of light intensity responsive to the reflected light becomes greater than or equal to the threshold;
    an image formation step of performing an operation of forming an image on the recording medium based on the width of the recording medium calculated in the width calculation step; and
    an image formation control step of halting the operation of forming the image on the recording medium upon detecting that the width of the recording medium calculated in the width calculation step is less than or equal to a predefined value.

* * * * *